United States Patent
Mitcsenkov et al.

(10) Patent No.: US 11,665,074 B2
(45) Date of Patent: May 30, 2023

(54) TECHNIQUE FOR PERFORMING ANALYSIS OF AN RTP FLOW

(71) Applicant: Telefonaktiebolaget LM Ericsson (publ), Stockholm (SE)

(72) Inventors: Attila Mitcsenkov, Budapest (HU); Attila Báder, Paty (HU); Ferenc Szász, Budapest (HU)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 17 days.

(21) Appl. No.: 17/268,641

(22) PCT Filed: Sep. 20, 2018

(86) PCT No.: PCT/EP2018/075479
§ 371 (c)(1),
(2) Date: Feb. 16, 2021

(87) PCT Pub. No.: WO2020/057746
PCT Pub. Date: Mar. 26, 2020

(65) Prior Publication Data
US 2021/0176152 A1  Jun. 10, 2021

(51) Int. Cl.
*H04L 12/26* (2006.01)
*H04L 29/06* (2006.01)
(Continued)

(52) U.S. Cl.
CPC .......... *H04L 43/0829* (2013.01); *H04L 43/04* (2013.01); *H04L 43/062* (2013.01);
(Continued)

(58) Field of Classification Search
CPC ... H04L 43/0829; H04L 43/04; H04L 43/062; H04L 43/087; H04L 43/12; H04L 65/608; H04L 43/0817; H04W 24/08
(Continued)

(56) References Cited

U.S. PATENT DOCUMENTS

| 7,796,532 B2 | 9/2010 | Connor et al. |
| 10,333,996 B2 * | 6/2019 | Singh .................. H04L 43/0852 |

(Continued)

FOREIGN PATENT DOCUMENTS

| CN | 108389592 A  * | 8/2018 | ............. G10L 25/60 |
| EP | 2187563 A1 | 5/2010 | |
| EP | 2187563 B1 * | 4/2012 | ......... H04L 41/5009 |

OTHER PUBLICATIONS

Network Working Group, RTP: A Transport Protocol for Real-Time Applications, Jul. 2003, pp. 33, Retrieved via URL: https://www.rfc-editor.org/rfc/rfc3550.pdf (Year: 2003).*

(Continued)

*Primary Examiner* — Schquita D Goodwin
(74) *Attorney, Agent, or Firm* — Christopher & Weisberg, P.A.

(57) ABSTRACT

A technique for performing segment-wise analysis of a Real-Time Transport Protocol, RTP, flow carried from a first User Equipment, UE, to a second UE via a mobile network is disclosed. The RTP flow is monitored by a plurality of probes in the mobile network, wherein each of the plurality of probes is configured to calculate at least one performance indicator indicative of a performance associated with the RTP flow observed between the first UE and the respective probe. A method implementation of the technique includes deriving at least one segment performance indicator for a segment of the RTP flow between a first probe of the plurality of probes and an endpoint of the segment by deducting the at least one performance indicator calculated by the first probe from at least one corresponding performance indicator associated with the endpoint.

13 Claims, 5 Drawing Sheets

(51) Int. Cl.
  *H04L 43/0829* (2022.01)
  *H04L 43/04* (2022.01)
  *H04L 43/062* (2022.01)
  *H04L 43/087* (2022.01)
  *H04L 43/12* (2022.01)
  *H04L 65/65* (2022.01)

(52) U.S. Cl.
  CPC ............ *H04L 43/087* (2013.01); *H04L 43/12* (2013.01); *H04L 65/65* (2022.05)

(58) Field of Classification Search
  USPC .......................................... 370/252
  See application file for complete search history.

(56) References Cited

U.S. PATENT DOCUMENTS

| | | | |
|---|---|---|---|
| 2003/0076840 A1* | 4/2003 | Rajagopal | H04L 45/28 370/465 |
| 2004/0066753 A1 | 4/2004 | Grovenburg | |
| 2008/0247331 A1 | 10/2008 | Becker et al. | |
| 2009/0059937 A1* | 3/2009 | Kanada | H04L 47/10 370/401 |
| 2009/0135724 A1* | 5/2009 | Zhang | H04L 41/5025 370/241 |
| 2011/0286348 A1* | 11/2011 | Yamasaki | H04L 43/062 370/252 |
| 2013/0215746 A1* | 8/2013 | Bhooma | H04L 47/11 370/235 |
| 2017/0302554 A1* | 10/2017 | Chandrasekaran | H04L 41/142 |
| 2017/0373950 A1* | 12/2017 | Szilagyi | H04L 47/2416 |
| 2018/0234316 A1* | 8/2018 | Ben-Dvora | H04L 43/0864 |
| 2018/0287910 A1* | 10/2018 | Sun | H04L 43/087 |
| 2019/0312923 A1* | 10/2019 | Rácz | H04W 24/08 |

OTHER PUBLICATIONS

International Search Report and Written Opinion dated Apr. 26, 2019 for International Application No. PCT/EP2018/075479 filed on Sep. 20, 2018, consisting of 11-pages.
Petr Matousek et al.; On-Line Monitoring of VOIP Quality Using IPFIX; Advances in Electrical and Electronic Engineering; Dec. 2014, pp. 325-333, vol. 12, No. 4; Information and Communication Technologies and Services; Czech Republic, consisting of 10-pages.

* cited by examiner

S302 — Derive at least one segment performance indicator for a segment of an RTP flow between a first probe of a plurality of probes and an endpoint of the segment by deducting at least one performance indicator calculated by the first probe from at least one corresponding performance indicator associated with the endpoint

TECHNIQUE FOR PERFORMING ANALYSIS OF AN RTP FLOW

CROSS-REFERENCE TO RELATED APPLICATIONS

This application is a Submission Under 35 U.S.C. § 371 for U.S. National Stage Patent Application of International Application Number: PCT/EP2018/075479, filed Sep. 20, 2018 entitled "TECHNIQUE FOR PERFORMING ANALYSIS OF AN RTP FLOW," the entirety of which is incorporated herein by reference.

TECHNICAL FIELD

The present disclosure generally relates to the field of mobile communication networks. In particular, a technique for performing segment-wise analysis of a Real-Time Transport Protocol (RTP) flow carried from a first User Equipment (UE) to a second UE via a mobile network is presented. The technique may be embodied in methods, computer programs, apparatuses and systems.

BACKGROUND

RTP is a network protocol for delivering audio and video over Internet Protocol (IP) networks. In WiFi or 4G networks, for example, RTP is used for voice and video telephony, such as Voice over WiFi, Voice over LTE (VoLTE) or Video over LTE (ViLTE), and, in 5G networks, RTP will be used for streaming media as well. RTP is typically used in conjunction with the RTP Control Protocol (RTCP). While RTP carries the media streams as such, RTCP is used to monitor transmission statistics and Quality of Service (QoS) of the media streams. RTP and RTCP are defined in IETF RFC 3550 (Internet Engineering Task Force—Request for Comments 3550).

Figure 1:
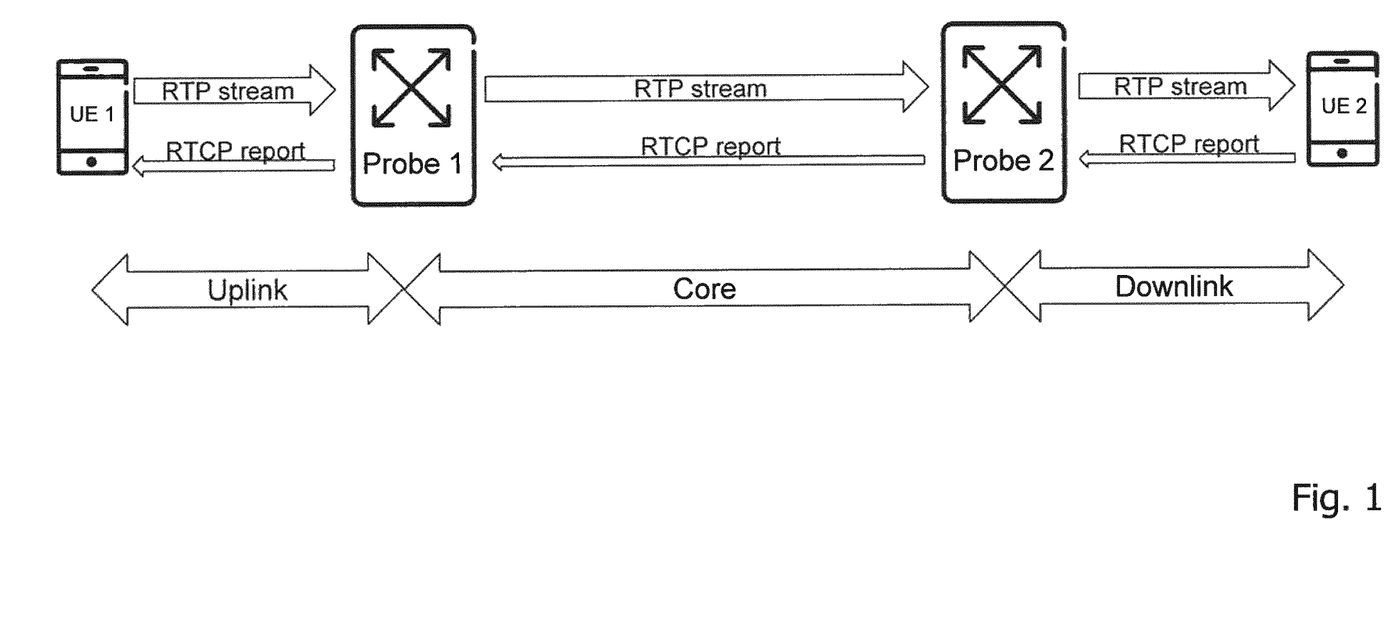
FIG. 1 illustrates an exemplary topology of a mobile network with intermediate RTP probes located at the gateway nodes of the mobile network.

Mobile network operators may monitor the RTP/RTCP traffic in order to ensure a desired QoS level of the media streams carried via the mobile network. Typically, media streams are monitored by high capacity traffic probes at the gateway nodes of the mobile network, where all media streams are available. FIG. 1 illustrates an exemplary topology of a mobile network with intermediate RTP probes located at the gateway nodes of the mobile network, wherein RTP/RTCP traffic is communicated between a first UE and a second UE attached to the mobile network and wherein a first probe is located at the gateway node assigned to the first UE and a second probe is located at the gateway node assigned to the second UE. While it will be understood that a bidirectional transmission between the first UE and the second UE may take place, FIG. 1 illustrates only one traffic direction for the sake of simplicity. In the illustrated example, the RTP stream flows from the first UE via the mobile network to the second UE, while corresponding RTCP receiver reports are transmitted from the second UE to the first UE. As indicated in FIG. 1, in such a scenario, the segment between the first UE and the first probe may be denoted as "uplink" segment of the RTP flow, the segment between the first probe and the second probe may be denoted as "core" segment of the RTP flow (corresponding to the core network of the mobile network), and the segment between the second probe and the second UE may be denoted as "downlink" segment of the RTP flow. Both the uplink segment and the downlink segment correspond to radio links. It will be understood that not only two probes but an arbitrary number of probes internal to the mobile network may be provided in the path of the RTP flow. The core network may then comprise intermediate core segments between each of the probes.

For the purpose of analyzing RTP media transmission performance, it is generally known to assess RTCP reports at the network probes. As RTCP reports provide end-to-end transmission statistics only, however, such assessment does not allow for a detailed analysis of the performance of the RTP flow and, in particular, does not allow for root cause analysis (RCA) when it comes to performance degradation of the media stream. Alternatively, the RTP packet flow itself may be assessed at the network probes using detailed RTP packet inspection. However, such assessment allows for a partial RCA only but no end-to-end analysis, because the downlink segment cannot be covered by the RTP packet analysis performed by the network probes. Further, while it is generally known to use dedicated test phones capable of performing detailed RTP packet inspection-based analysis to provide end-to-end coverage in performance analysis, such solution only works with designated test phones and calls conducted with these phones. Large scale monitoring of all calls conducted in the mobile network using common UEs (i.e., UEs which have no dedicated test functionality) is generally not possible, however.

SUMMARY

Accordingly, there is a need for a technique that allows improved analysis of RTP flows which avoids one or more of the problems discussed above, or other problems.

According to a first aspect, a method for performing segment-wise analysis of an RTP flow carried from a first UE to a second UE via a mobile network is provided. The RTP flow is monitored by a plurality of probes in the mobile network, wherein each of the plurality of probes is configured to calculate at least one performance indicator indicative of a performance associated with the RTP flow observed between the first UE and the respective probe. The method comprises deriving at least one segment performance indicator for a segment of the RTP flow between a first probe of the plurality of probes and an endpoint of the segment by deducting the at least one performance indicator calculated by the first probe from at least one corresponding performance indicator associated with the endpoint.

In one implementation, the endpoint may be a second probe of the plurality of probes and the at least one performance indicator associated with the endpoint may be the at least one performance indicator calculated by the second probe. The at least one performance indicator of the first probe and the at least one performance indicator of the second probe may be calculated based on RTP packets of the RTP flow monitored at the first probe and the second probe. The first probe may be implemented at a first gateway of the mobile network used for the first UE and the second probe may be implemented at a second gateway of the mobile network used for the second UE so that the segment corresponds to a core network segment of the RTP flow in the mobile network.

In another implementation, the endpoint may be the second UE and the at least one performance indicator associated with the endpoint may correspond to at least one performance indicator included in an RTP Control Protocol, RTCP, report of the second UE. In this case, the first probe may be implemented at a second gateway of the mobile network used for the second UE so that the segment corresponds to a downlink segment of the RTP flow from the mobile network to the second UE. The at least one performance indicator of the first probe may be calculated based on RTP packets of the RTP flow monitored at the first probe, wherein sequence numbers of the RTP packets may correspond to sequence numbers covered by the RTCP report.

The at least one performance indicator calculated by the first probe may comprise at least one of a cumulative number of packets lost between the first UE and the first probe, a ratio of lost packets between the first UE and the first probe, and a jitter value for packets between the first UE and the first probe. Similarly, the at least one performance indicator associated with the endpoint may comprise at least one of a cumulative number of packets lost between the first UE and the endpoint, a ratio of lost packets between the first UE and the endpoint, and a jitter value for packets between the first UE and the endpoint.

The first probe may record a packet loss counter for every sequence number of received RTP packets, wherein, upon arrival of a new RTCP report from the second UE, the first probe may calculate the cumulative number of packets lost between the first UE and the first probe as a difference between the packet loss counter recorded for a sequence number corresponding to a highest sequence number indicated in the new RTCP report and the packet loss counter recorded for a sequence number corresponding to a highest sequence number indicated in a previous RTCP report. After calculating the cumulative number of packets lost between the first UE and the first probe since the previous RTCP report, the first probe may delete packet loss counters recorded for sequence numbers up to the highest sequence number indicated in the new RTCP report.

Deducting the cumulative number of packets lost between the first UE and the first probe from the cumulative number of packets lost between the first UE and the endpoint may include subtracting the cumulative number of packets lost between the first UE and the first probe from the cumulative number of packets lost between the first UE and the endpoint. Deducting the ratio of lost packets between the first UE and the first probe from the ratio of lost packets between the first UE and the endpoint may include converting the ratio of lost packets between the first UE and the first probe and the ratio of lost packets between the first UE and the endpoint to a cumulative number of packets lost between the first UE and the first probe and a cumulative number of packets lost between the first UE and the endpoint, respectively, subtracting the converted cumulative number of packets lost between the first UE and the first probe from the converted cumulative number of packets lost between the first UE and the endpoint, and converting the resulting cumulative number of packets lost on the segment to the ratio of lost packets on the segment.

In one implementation, the first probe may calculate the jitter value for packets between the first UE and the first probe as a standard deviation of inter-arrival times for a predefined period of time. In another implementation, the first probe may calculate the jitter value for packets between the first UE and the first probe using a continuous sliding window scheme using the following formula:

$$J(i) = J(i-1) - \frac{|D(i, i-1)| - J(i-1)}{16}$$

wherein, for packet i, J denotes a current jitter value and D denotes a difference of packet spacing between sender and receiver. Deducting the jitter value for packets between the first UE and the first probe from the jitter value for packets between the first UE and the endpoint may include applying the following formula:

$$J_1 \ominus J_2 = \sqrt{J_1^2 - J_2^2}$$

wherein $J_1$ denotes the jitter value for packets between the first UE and the first probe and $J_2$ denotes the jitter value for packets between the first UE and the endpoint.

According to a second aspect, a computer program product is provided. The computer program product comprises program code portions for performing the method of the first aspect when the computer program product is executed on one or more computing devices (e.g., a processor or a distributed set of processors). The computer program product may be stored on a computer readable recording medium, such as a semiconductor memory, DVD, CD-ROM, and so on.

According to a third aspect, a computing unit for performing segment-wise analysis of an RTP flow carried from a first UE to a second UE via a mobile network is provided. The RTP flow is monitored by a plurality of probes in the mobile network, wherein each of the plurality of probes is configured to calculate at least one performance indicator indicative of a performance associated with the RTP flow observed between the first UE and the respective probe. The computing unit comprises at least one processor and at least one memory, wherein the at least one memory contains instructions executable by the at least one processor such that the computing unit is operable to perform any of the method steps presented herein with respect to the first aspect.

According to a fourth aspect, there is provided a mobile network comprising a computing unit according to the third aspect.

BRIEF DESCRIPTION OF THE DRAWINGS

Implementations of the technique presented herein are described herein below with reference to the accompanying drawings, in which.

DETAILED DESCRIPTION

In the following description, for purposes of explanation and not limitation, specific details are set forth in order to provide a thorough understanding of the present disclosure. It will be apparent to one skilled in the art that the present disclosure may be practiced in other embodiments that depart from these specific details.

Those skilled in the art will further appreciate that the steps, services and functions explained herein below may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors.

Figure 2:
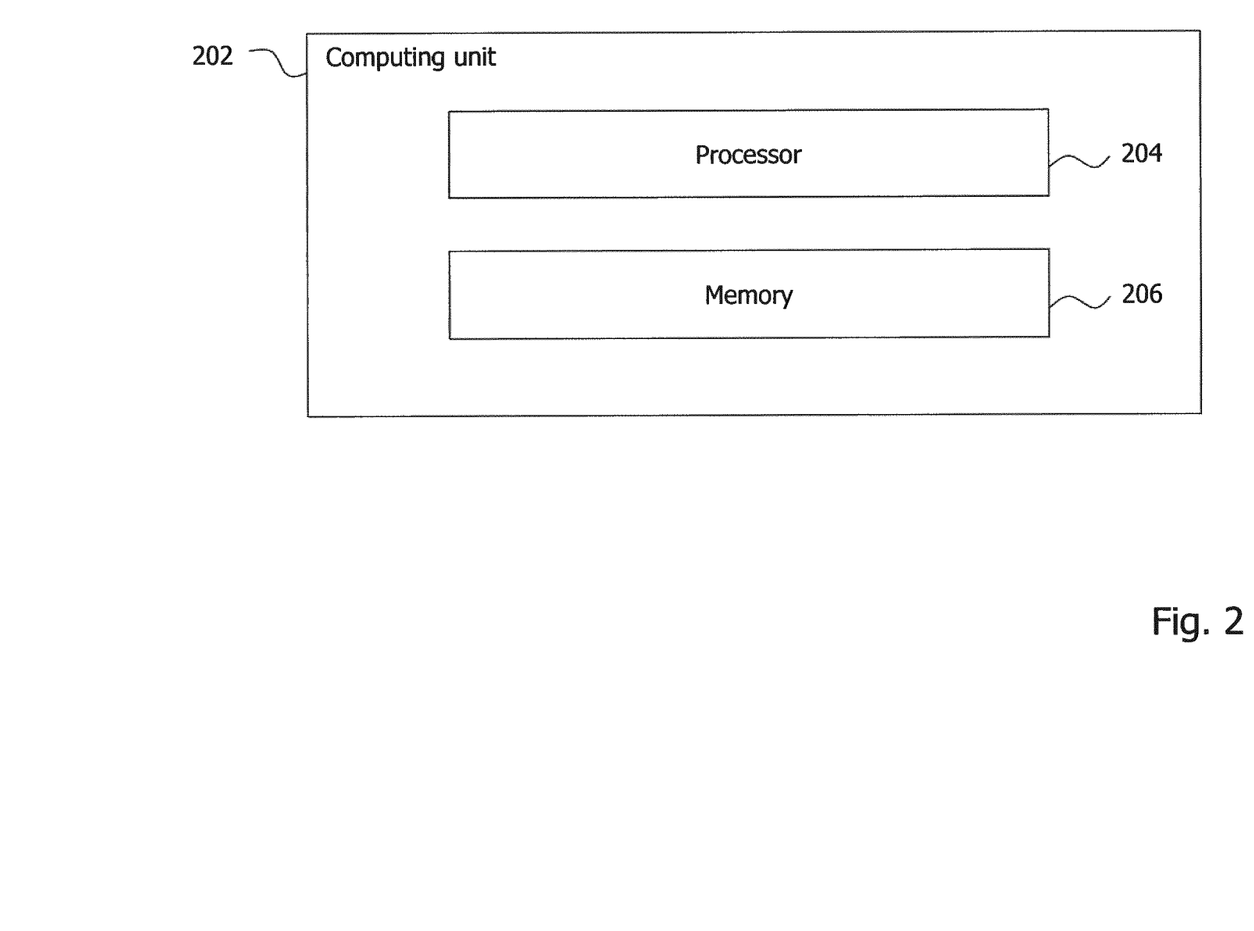
FIG. 2 illustrates an exemplary composition of a computing unit according to the present disclosure.
Figure 3A:
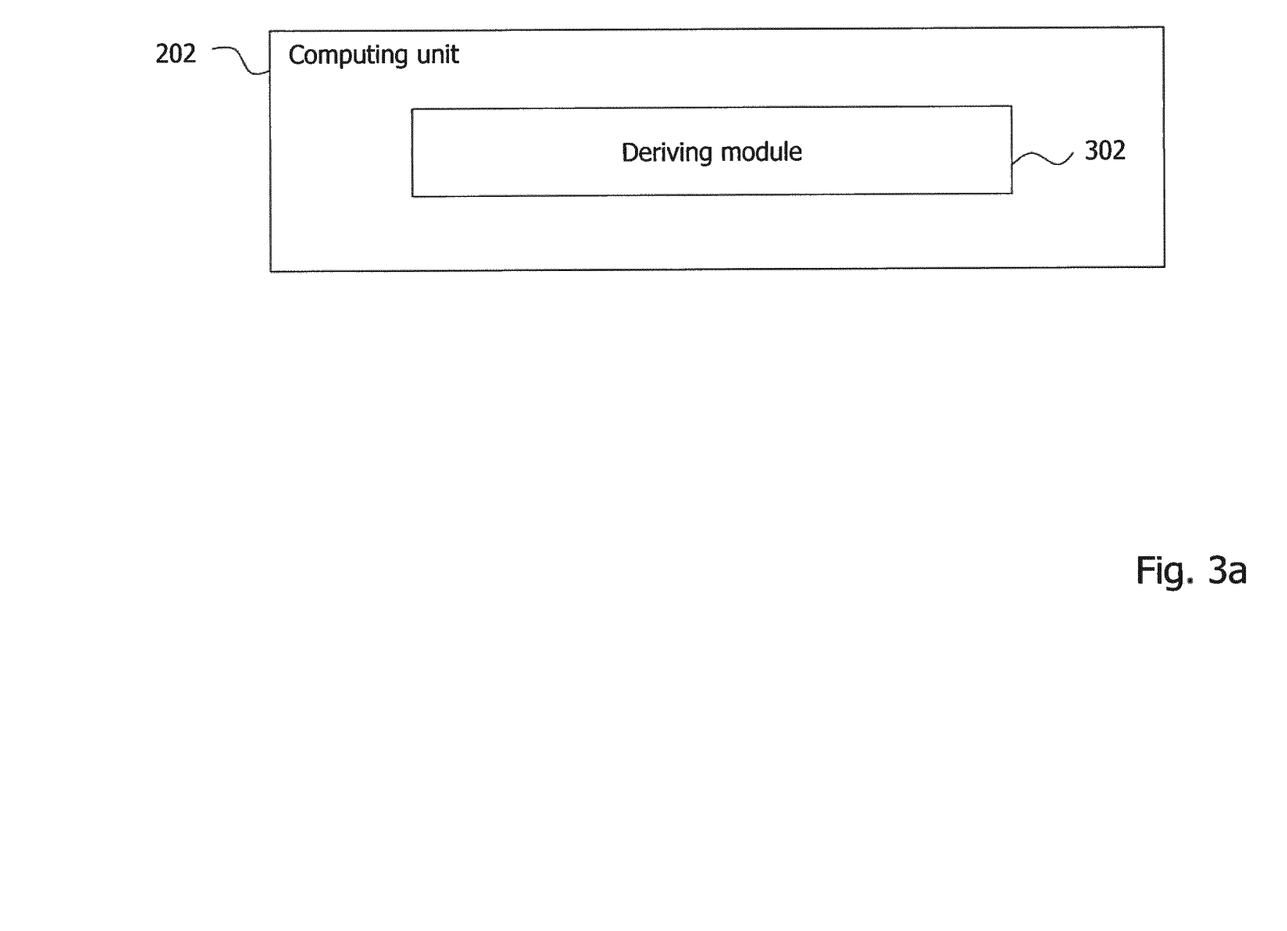
FIGS. 3a and 3b illustrate a modular composition of the computing unit and a corresponding method embodiment which may be performed by the computing unit.
Figure 3B:
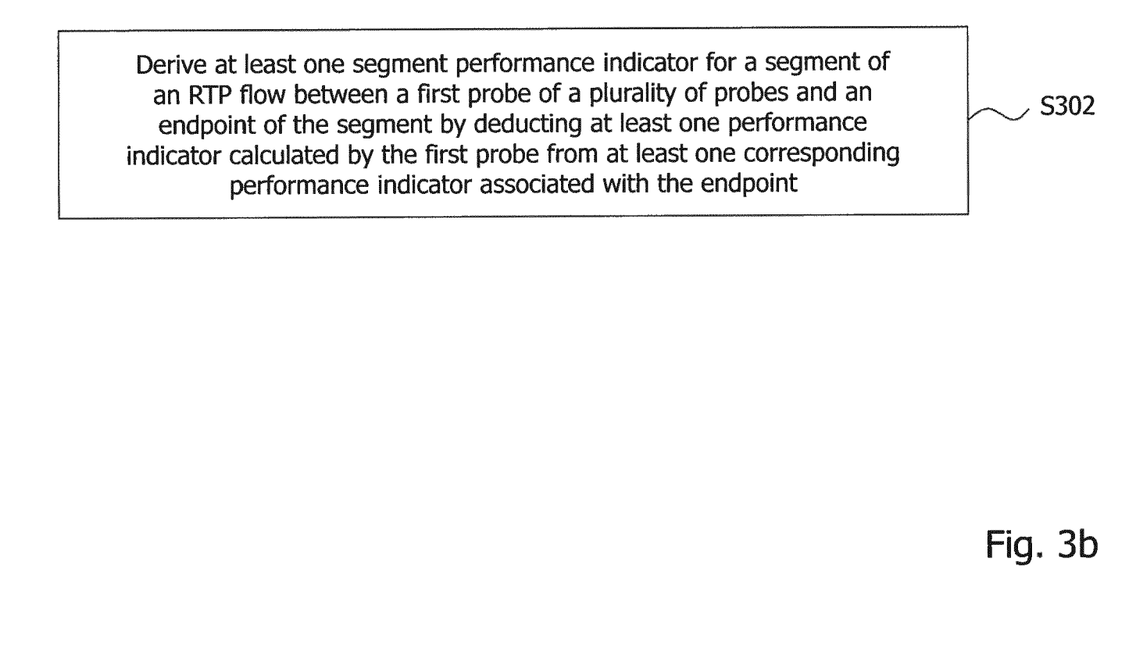

FIG. 2 schematically illustrates an exemplary composition of a computing unit 202 for performing segment-wise analysis of an RTP flow carried from a first UE to a second UE via a mobile network. The computing unit 202 comprises at least one processor 204 and at least one memory 206, wherein the at least one memory 206 contains instructions executable by the at least one processor 204 such that the computing unit 202 is operable to carry out the method steps described herein below. FIG. 3a schematically illustrates an exemplary modular composition of the computing unit 202 and FIG. 3b illustrates a corresponding method which may be performed by the computing unit 202. The basic operation of the computing unit 202 will be described in the following with reference to both FIGS. 3a and 3b.

The RTP flow to be analyzed is carried from a first UE to a second UE via a mobile network. The RTP flow is monitored by a plurality of probes in the mobile network, wherein each of the plurality of probes is configured to calculate at least one performance indicator indicative of a performance associated with the RTP flow observed between the first UE and the respective probe. As shown in FIGS. 3a and 3b, a deriving module 302 of the computing unit 202 derives, in step S302, at least one segment performance indicator for a segment of the RTP flow between a first probe of the plurality of probes and an endpoint of the segment by deducting the at least one performance indicator calculated by the first probe from at least one corresponding performance indicator associated with the endpoint.

Thus, in order to analyze the performance of the RTP flow on a particular segment of interest, a deduction between respective performance indicators may be performed. With respect to the RTP flow, the endpoint may be located downstream from the first probe and, therefore, the at least one performance indicator calculated by the first probe may be associated with a first portion of the RTP flow (i.e., the portion between the first UE and the first probe) which may be a sub-portion of a second portion of the RTP flow (i.e., the portion between the first UE and the endpoint of the segment of interest) that is associated with at least one corresponding performance indicator associated with the endpoint. A deduction of the at least one performance indicator associated with the first portion of the RTP flow from the at least one corresponding performance indicator associated with the second portion of the RTP flow may thus deliver a difference that is indicative of the performance associated with the RTP flow on the segment of interest, i.e., the at least one segment performance indicator mentioned above.

Figure 4:
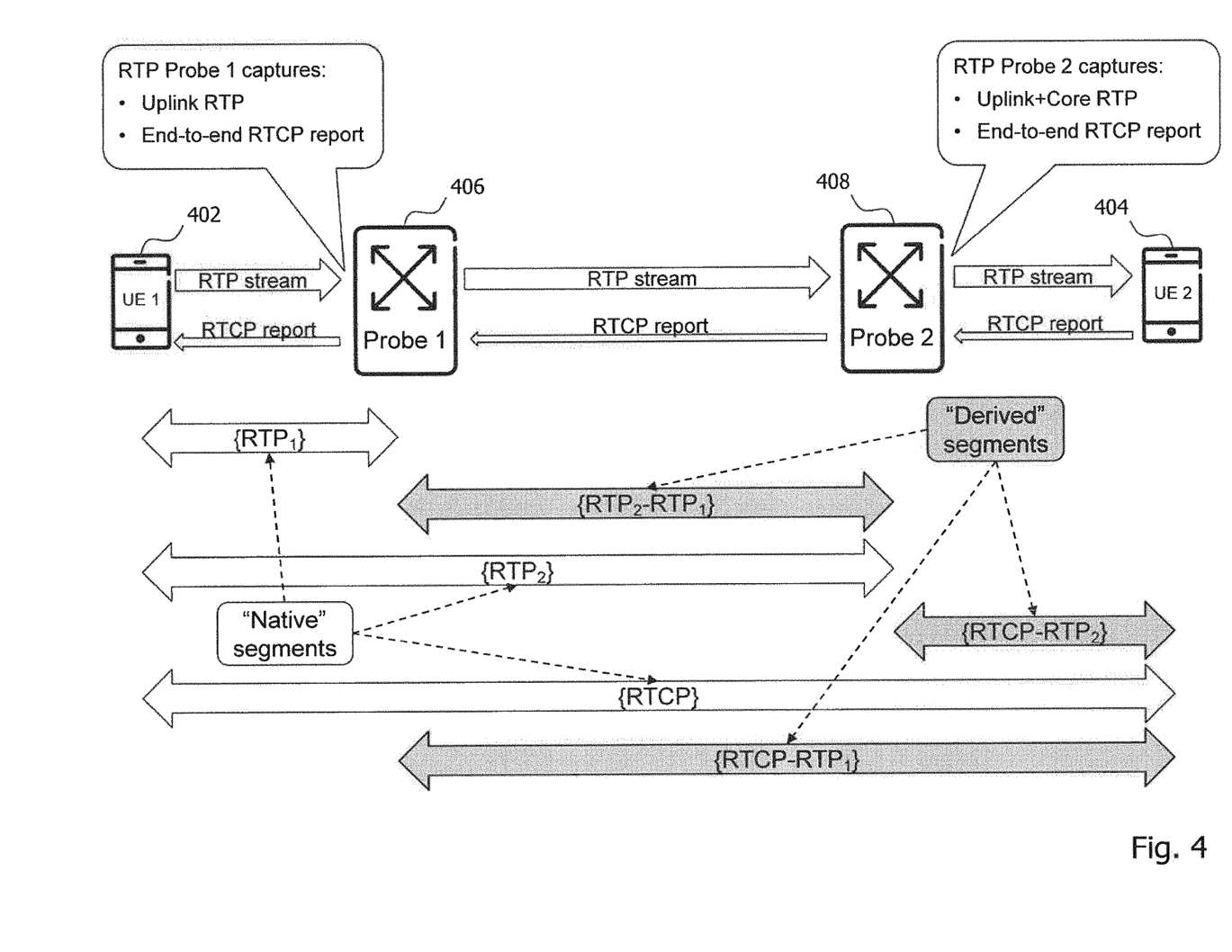
FIG. 4 illustrates an exemplary topology of a mobile network with intermediate RTP probes including native and derived segments according to the present disclosure.

The segment of interest may correspond to a portion of the overall transmission path of the RTP flow between two probes of the plurality of probes or between one of the plurality of probes and the second UE. The endpoint of the segment of interest may thus correspond to a second probe of the plurality of probes (i.e., a probe downstream the first probe) or to the second UE. FIG. 4 shows an exemplary network topology which basically resembles the example shown in FIG. 1. In FIG. 4, the segments of interest are denoted as "derived" segments.

In the example shown in FIG. 4, an RTP flow is carried from a first UE 402 to a second UE 404 attached to the mobile network, wherein a first probe 406 is implemented at a gateway of the mobile network assigned to the first UE 402 and a second probe 408 is implemented at a gateway node of the mobile network assigned to the second UE 404. In the illustrated example, RTP packets flow as part of an RTP stream from the first UE 402 via the mobile network to the second UE 404, while corresponding RTCP reports are transmitted from the second 404 to the first UE 402.

As indicated in the figure, the first probe 406 may capture RTP packets from the RTP flow to calculate at least one performance indicator indicative of a performance associated with the RTP flow observed on the uplink segment (i.e., between the first UE 402 and the first probe 406) and may capture RTCP reports transmitted from the second UE 404 to the first UE 402 that include at least one corresponding performance indicator indicative of an end-to-end performance associated with the RTP flow between the first UE 402 of the second UE 404. Similarly, the second probe 408 may capture RTP packets from the RTP flow to calculate at least one performance indicator indicative of a performance associated with the RTP flow observed on the uplink and core segment (i.e., between the first UE 402 and the second probe 408) and may capture RTCP reports transmitted from the second UE 404 to the first UE 402 that include at least one corresponding performance indicator indicative of an end-to-end performance associated with the RTP flow between the first UE 402 and the second UE 404.

In FIG. 4, segments for which the performance indicators are known from the above calculations and RTCP reports are denoted as "native" segments. As shown, among the native segments, the uplink segment between the first UE 402 and the first probe 406 is characterized by at least one performance indicator $\{RTP_1\}$, the uplink and core segment between the first UE 402 and the second probe 408 is characterized by at least one performance indicator $\{RTP_2\}$, and the end-to-end performance including the uplink, core and downlink segment between the first UE 402 and the second UE 404 is characterized by at least one corresponding performance indicator $\{RTCP\}$ included in the RTCP reports.

According to the technique presented herein, from these native performance indicators, additional performance indicators for particular segments of interest may be derived by carrying out respective deductions. In FIG. 4, these segments of interest are denoted as "derived" segments. As shown in the figure, for the core segment between the first probe 406 and the second probe 408, at least one segment performance indicator may be derived by deducting $\{RTP_1\}$ from $\{RTP_2\}$ (indicated as $\{RTP_2-RTP_1\}$ in the figure). Similarly, for the downlink segment between the second probe 408 and the second UE 404, at least one segment performance indicator may be derived by deducting $\{RTP_2\}$ from $\{RTCP\}$ (indicated as $\{RTCP-RTP_2\}$ in the figure). Further, for the core and downlink segment between the first probe 406 and the second UE 404, at least one segment performance indicator may be derived by deducting $\{RTP_1\}$ from $\{RTCP\}$ (indicated as $\{RTCP-RTP_1\}$ in the figure).

It will be understood that the topology shown in FIG. 4 is merely exemplary and that, in particular, not only two probes but an arbitrary number of probes may be provided in the mobile network. The core network may then comprise intermediate core segments between each of the probes. Further, the probes do not necessarily have to be implemented at the gateway nodes but may also be implemented at other nodes of the mobile network. Assuming probes i=1, n between the first UE and the second UE in the mobile network, corresponding segment performance indicators may more generally be defined as follows:

For the uplink segment between the first UE and probe 1: $\{RTP_1\}$

For an intermediate segment between probe i and i+1: $\{RTP_{i+1}-RTP_i\}$

For the downlink segment between probe n and the second UE: $\{RTCP-RTP_n\}$

As mentioned above, such relationship regarding derived segments of interest may generally be formulated in that at least one segment performance indicator for a segment of the RTP flow between a first probe of the plurality of probes and an endpoint of the segment may be derived by deducting the at least one performance indicator calculated by the first probe from at least one corresponding performance indicator associated with the endpoint. In one implementation, which corresponds to the above-mentioned case that the segment of interest corresponds to an intermediate segment between two probes, such as between probe i and i+1, the endpoint may be a second probe of the plurality of probes and the at least one performance indicator associated with the endpoint may be the at least one performance indicator calculated by the second probe. The at least one performance indicator of the first probe and the at least one performance indicator of the second probe may be calculated based on RTP packets of the RTP flow monitored at the first probe and the second probe. Also, as mentioned above, in a particular such variant, the first probe may be implemented at a first gateway of the mobile network used for the first UE and the second probe may be implemented at a second gateway of the mobile network used for the second UE so that the segment corresponds to a core network segment of the RTP flow in the mobile network.

In another implementation, which corresponds to the above-mentioned case that the segment of interest corresponds to a downlink segment between probe n and the second UE, the endpoint may be the second UE and the at least one performance indicator associated with the endpoint may correspond to at least one performance indicator included in an RTCP report of the second UE (i.e., transmitted from the second UE to the first UE). The first probe may in this case be implemented at a second gateway of the mobile network used for the second UE so that the segment corresponds to a download segment of the RTP flow from the mobile network to the second UE.

In one variant, the at least one performance indicator of the first probe may be calculated based on RTP packets of the RTP flow monitored at the first probe, wherein the sequence numbers of the RTP packets may correspond to sequence numbers covered by the RTCP report. RTP data and RTCP data based on which the segment performance indicator is derived may thus be aligned. Such alignment may be achieved by matching the "highest sequence number received" field included in the RTCP report (in accordance with IETF RFC 3550) with corresponding sequence numbers of the RTP packets of the RTP flow. RTP/RTCP alignment may also be achieved by matching reporting periods of RTCP reports and corresponding RTP reports generated by the probes. Since RTCP may have a fixed reporting period (which may depend on the implementation and is e.g. 5 seconds), corresponding RTP reports may have the same reporting period and may be synchronized with that of the RTCP reports. When the at least one performance indicator is derived from two RTP reports (e.g., when the segment of interest corresponds to an intermediate segment between two probes, such as between probe i and i+1, as described above), the two RTP reporting periods may be the same and preferably be synchronized as well, but may differ from the RTCP reporting period. Reasonable reporting periods may be between 1 second and 10 seconds, for example. When performing the alignment, it may also be taken into account that sequence number restarts may occur in both RTP sequence number counters and RTCP reports. Further, it may be taken into account that misaligned sequence number boundaries may occur due to downlink packet losses. For example, it may be considered that certain RTP packets lost at the beginning or end of new RTCP packet segments may be reported as lost packets in the next RTCP report.

As regards the performance parameters to be assessed when analyzing the RTP flow, packet loss and jitter may be of particular interest. The least one performance indicator calculated by the first probe may thus comprise at least one of a cumulative number of packets lost between the first UE and the first probe, a ratio of lost packets between the first UE and the first probe, and a jitter value for packets between the first UE and the first probe. Similarly, the at least one performance indicator associated with the endpoint may comprise at least one of a cumulative number of packets lost between the first UE and the endpoint, a ratio of lost packets between the first UE and the endpoint, and a jitter value for packets between the first UE and the endpoint. When deriving a segment performance indicator for a segment of interest, the deduction may then be carried out based on corresponding ones of these performance indicators. For example, a segment performance indicator that corresponds to a cumulative number of lost packets may be derived by deducting the cumulative number of packets lost between the first UE and the first probe from the cumulative number of packets lost between the first UE and the endpoint. Similarly, a segment performance indicator that corresponds to a ratio of lost packets may be derived by deducting the ratio of lost packets between the first UE and the first probe from the ratio of lost packets between the first UE and the endpoint. Further, a segment performance indicator that corresponds to a jitter value may be derived by deducting the jitter value for packets between the first UE and the first probe from the jitter value for packets between the first UE and the endpoint. It follows that the at least one segment performance indicator for the segment of interest may comprise at least one of a cumulative number of packets lost on the segment of interest, a ratio of lost packets on the segment of interest, and a jitter value for packets on the segment of interest.

Such performance indicators, i.e., indicators regarding packet loss and jitter, may be contained in the RTCP reports, namely in the fields "cumulative number of packets lost", "fraction lost" and "interarrival jitter" in accordance with IETF RFC 3550. For corresponding RTP reports, these parameters need to be calculated by the probes based on information collected by detailed RTP packet inspection. In one such implementation, for RTCP compliant packet loss calculation, the first probe may record a packet loss counter for every sequence number of received RTP packets, wherein, upon arrival of a new RTCP report from the second UE, the first probe may calculate the cumulative number of packets lost between the first UE and the first probe as a difference between the packet loss counter recorded for a sequence number corresponding to a highest sequence number indicated in the new RTCP report and the packet loss counter recorded for a sequence number corresponding to a highest sequence number indicated in a previous RTCP report. The difference between the highest sequence number of the new RTCP report and the highest sequence number of the previous RTCP report may indicate the length of the corresponding RTCP slice. The first probe may also maintain a last sequence number counter to track the last sequence number of an RTP packet received at the first probe, for example, which may be updated upon each arrival of an RTP packet. After calculating the cumulative number of packets lost between the first UE and the first probe since the previous RTCP report, the first probe may delete packet loss counters recorded for sequence numbers up to the highest sequence number indicated in the new RTCP report. It will be understood that equivalent calculations may be performed at the second probe for the purpose of RTCP compliant packet loss calculation at the second probe.

Thus determined packet losses may be subject to addition or subtraction operations. In the following, the addition or subtraction of one of the above-mentioned performance indicators will be denoted by the "⊕" and "⊖" operators. In case of two cumulative numbers of packets lost $L_1$ and $L_2$, an addition or subtraction of $L_1$ and $L_2$ may simply be calculated as an integer addition or subtraction, i.e.:

$$L_1 \oplus L_2 = L_1 + L_2$$

$$L_1 \ominus L_2 = L_1 - L_2$$

Deducting the cumulative number of packets lost between the first UE and the first probe from the cumulative number of packets lost between the first UE and the endpoint may thus include subtracting the cumulative number of packets lost between the first UE and the first probe from the cumulative number of packets lost between the first UE and the endpoint. An addition or subtraction of two ratios of lost packets may be implemented using the above operations as well, namely by first converting the ratios to the corresponding cumulative numbers of packets lost (e.g., by multiplying the respective ratio by the length of the respective segment), performing the addition or subtraction operation indicated above, and then converting the resulting cumulative numbers back to the ratios (e.g., by dividing the respective cumulative number by the length of the respective segment). Deducting the ratio of lost packets between the first UE and the first probe from the ratio of lost packets between the first UE and the endpoint may thus include converting the ratio of lost packets between the first UE and the first probe and the ratio of lost packets between the first UE and the endpoint to a cumulative number of packets lost between the first UE and the first probe and a cumulative number of packets lost between the first UE and the endpoint, respectively, subtracting the converted cumulative number of packets lost between the first UE and the first probe from the converted cumulative number of packets lost between the first UE and the endpoint, and converting the resulting cumulative number of packets lost on the segment to the ratio of lost packets on the segment.

Jitter calculation, on the other hand, may be more complex than the calculation of packet losses. In one implementation, the first probe may calculate the jitter value for packets between the first UE and the first probe as a standard deviation of inter-arrival times (IATs) for a predefined period of time, e.g., the time of an RTCP slice. In this case, all IATs may have equal weights and may be reset to zero at the end of the period of time. In another implementation, which may be compliant with the "interarrival jitter" calculation of RTCP reports in accordance with IETF RFC 3550, the first probe may calculate the jitter value for packets between the first UE and the first probe using a continuous sliding window scheme using the following formula:

$$J(i) = J(i-1) - \frac{|D(i, i-1)| - J(i-1)}{16}$$

wherein, for packet i, J denotes a current jitter value and D denotes a difference of packet spacing between sender and receiver. The current jitter value may then be taken using this formula whenever an RTCP report is generated. $D(i,j)$ may be expressed as $$D(i,j) = (R_j - R_i) - (S_j - S_i) = (R_j - S_j) - (R_i - S_i)$$

wherein $S_i$ is the RTP timestamp for packet i at the sender and $R_i$ is the arrival timestamp at the receiver. More details regarding this calculation of the jitter value can be found in IETF RFC 3550. It will be understood that equivalent calculations may be performed at the second probe for the purpose of RTCP compliant jitter calculation at the second probe.

As jitter may not correspond to a quantity type metric, addition and subtraction of jitter values may follow standard deviation operations. An addition or subtraction of two jitter values $J_1$ and $J_2$ may thus be calculated using the following operators:

$$J_1 \oplus J_2 = \sqrt{J_1^2 + J_2^2}$$

$$J_1 \ominus J_2 = \sqrt{J_1^2 - J_2^2}$$

Deducting the jitter value for packets between the first UE and the first probe from the jitter value for packets between the first UE and the endpoint may thus include applying the following formula:

$$J_1 \ominus J_2 = \sqrt{J_1^2 - J_2^2}$$

wherein $J_1$ denotes the jitter value for packets between the first UE and the first probe and $J_2$ denotes the jitter value for packets between the first UE and the endpoint.

Thus determined jitter values may then be compared for different segments of interest, such as for the uplink segment between the first UE and probe 1, for intermediate segments between probe i and i+1, and for the downlink segment between probe n and the second UE, for example, and the comparison of these jitter values may help to isolate which segment may be responsible for an abnormally high jitter in the network. A similar RCA may be performed based on a comparison of the packet losses calculated for different segments of interest.

Using the arithmetic operations defined above, again assuming probes i=1, n in the mobile network, corresponding segment performance indicators may be defined in general form as follows:

For the uplink segment between the first UE and probe 1:
PacketLoss$_{uplink}$=PacketLoss$_1$
Jitter$_{uplink}$=Jitter$_1$
For the uplink segment between the first UE and probe 1:
PacketLoss$_{i, i+1}$=PacketLoss$_{i+1}$⊖PacketLoss$_1$
Jitter$_{i, i+1}$=Jitter$_{i+1}$⊖Jitter$_1$
For the uplink segment between the first UE and probe 1:
PacketLoss$_{downlink}$=PacketLoss$_{e2e}$⊖PacketLoss$_n$
Jitter$_{downlink}$=Jitter$_{e2e}$⊖Jitter$_n$ Here, PacketLoss$_i$ and Jitter$_i$ denote the packet loss and the jitter value measured at probe i and PacketLoss$_{e2e}$ and Jitter$_{e2e}$ denote the packet loss and the jitter value indicated in the end-to-end RTCP reports transmitted from the second UE to the first UE.

As described above, the method steps described herein may be carried out by the computing unit 202 illustrated in FIGS. 2 and 3a. To be able to perform these method steps, the computing unit 202 may obtain the information required for deriving the segment performance indicators from the respective probes in the mobile network. In one variant, the computing unit 202 may be a node of the mobile network that implements one of the probes. In another variant, the computing unit 202 may be a separate node of the mobile network that communicates with the respective probes to obtain the required information. It will be understood in this regard that the computing unit 202 may be implemented as a physical computing unit as well as a virtualized computing unit, such as a virtual machine, for example. It will further be appreciated that the computing unit 202 may not necessarily be implemented as a standalone computing unit, but may be implemented as components—realized in software and/or hardware—residing on multiple distributed computing units as well, such as in a cloud computing environment, for example.

As has become apparent from the above, the present disclosure provides a technique for performing segment-wise analysis of an RTP flow carried from a first UE to a second UE via a mobile network. According to the presented technique, combined RTP and RTCP based analysis may be made available at intermediate RTP probes, with focus on packet loss and jitter, so that the contribution of a specific segment <probe i, probe i+1> may be calculated by deducting the impact of segment <first UE, probe i> from the impact of segment <first UE, probe i+1> based on RTP based analysis and the contribution of the last segment <probe n, second UE> may be calculated by deducting the impact of segment <first UE, probe n> (determined based on RTP analysis) from the end-to-end impact gathered from RTCP reports.

As described above, while RTP based analysis in the network probes may provide more details and insights than the RTCP reports, RTP based analysis alone may not be able to provide end-to-end coverage in performance analysis because only the network segment from the originating UE to the last probe in the network may be included in the analysis, whereas the downlink segment from the last probe to the terminating UE may remain invisible for RTP probes. RTCP reports, on the other hand, may provide end-to-end performance statistics, but only contain predefined aggregated metrics with less details than available through in-depth RTP based analysis.

According to the technique presented herein, RTP and RTCP based analysis may thus be combined in order to bring the advantages of detailed analysis and end-to-end coverage together. In particular, the combination of RTP and RTCP based analysis may allow end-to-end coverage of the RTP flow so that packet loss or jitter suffered along the complete media path between the originating UE and the terminating UE may be determined and RCA may be allowed on all network segments between the originating UE and the terminating UE, thereby allowing to reveal which segment of the network is responsible for the detected packet loss or jitter. On the other hand, since—as compared to the aggregated metrics of RTCP reports—RTP based packet inspection may provide significantly more details on packet loss patterns or jitter behavior, a more detailed in-depth analysis may be possible. The technique presented herein may also be suitable to perform large scale monitoring of all calls within the mobile network, despite the absence of dedicated test phones and high traffic load imposed on the monitoring system. Network operators may thereby perform real-time and automated monitoring of the media quality throughout the network. The presented technique may be implemented using standard protocols and may not require new protocol functionality or active devices.

It is further noted that the technique presented herein may also work when the media stream is transcoded in the core network. Media streams transported in a mobile network may be subject to transcoding performed by gateways along the media path. Transcoding may generally refer to a "regeneration" of the media stream due to the fact that a media transcoding gateway may act as a new "source" of the media stream. In such cases, the end-to-end RTCP report may provide information on the media streams spanning between the transcoding gateway and the terminating UE, wherein RTP probes between the transcoding gateway and the terminating UE may analyze the media stream that originates from the transcoding gateway (because, in this case, the transcoding gateway appears as the "source", i.e., as the originating UE). When it is said above that a respective probe is configured to calculate at least one performance indicator indicative of a performance associated with the RTP flow observed between the first UE and the probe, this may mean that the "first UE" corresponds to the transcoding gateway when transcoding is used. Transcoding may thus not prevent the technique presented herein from being used but only modify its scope to a partial RTP stream from the transcoding gateway to the terminating UE. Other parts of the whole RTP stream, such as from the originating UE to the transcoding gateway, may then be treated in an analogous manner so that end-to-end coverage and RCA on all network segments between the originating UE and the terminating UE may still be achieved. The use of transcoding in the network may be detected by sequence number changes in RTP data and RTCP reports captured at the RTP probes, for example.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for performing segment-wise analysis of a Real-Time Transport Protocol, RTP, flow carried from a first User Equipment, UE, to a second UE via a mobile network, the RTP flow being monitored by a plurality of probes in the mobile network, each of a first probe of the plurality of probes and a second probe of the plurality of probes is configured to calculate at least one performance indicator indicative of a performance associated with the RTP flow observed between the first UE and the respective probe, the method comprising:
   deriving at least one segment performance indicator for a segment of the RTP flow between the first probe and the second probe of the segment by deducting the at least one performance indicator calculated by the first probe from at least one corresponding performance indicator associated with the second probe,
   deriving at least one segment performance indicator for a segment of the RTP flow between the first probe and the second UE of the segment by deducting the at least one performance indicator calculated by the first probe from at least one corresponding performance indicator associated with the second UE,
   deriving at least one segment performance indicator for a segment of the RTP flow between the second probe and the second UE of the segment by deducting the at least one performance indicator calculated by the second probe from the at least one corresponding performance indicator associated with the second UE, and the at least one corresponding performance indicator associated with the second UE corresponding to at least one performance indicator included in an RTP Control Protocol, RTCP, report of the second UE, the at least one performance indicator calculated by the first probe comprising a jitter value for packets between the first UE and the first probe and a cumulative number of packets lost between the first UE and the first probe, the first probe recording a packet loss counter for every sequence number of received RTP packets, and upon arrival of a new RTCP report from the second UE, the first probe calculates the cumulative number of packets lost between the first UE and the first probe as a difference between the packet loss counter recorded for a sequence number corresponding to a highest sequence number indicated in the new RTCP report and the packet loss counter recorded for a sequence number corresponding to a highest sequence number indicated in a previous RTCP report, the first probe calculating the jitter value for packets between the first UE and the first probe as a standard deviation of inter-arrival times for a predefined period of time.

2. The method of claim 1, wherein the at least one performance indicator of the first probe and the at least one performance indicator of the second probe are calculated based on RTP packets of the RTP flow monitored at the first probe and the second probe.

3. The method of claim 2, wherein the first probe is implemented at a first gateway of the mobile network used for the first UE and the second probe is implemented at a second gateway of the mobile network used for the second UE so that the segment corresponds to a core network segment of the RTP flow in the mobile network.

4. The method of claim 1, wherein the at least one performance indicator of the first probe is calculated based on RTP packets of the RTP flow monitored at the first probe and wherein sequence numbers of the RTP packets correspond to sequence numbers covered by the RTCP report.

5. The method of claim 1, wherein the at least one performance indicator calculated by the first probe comprises a ratio of lost packets between the first UE and the first probe.

6. The method of claim 1, wherein the at least one performance indicator associated with the second UE comprises at least one of:
  a cumulative number of packets lost between the first UE and the second UE,
  a ratio of lost packets between the first UE and the second UE and
  a jitter value for packets between the first UE and the second UE.

7. The method of claim 1, wherein, after calculating the cumulative number of packets lost between the first UE and the first probe since the previous RTCP report, the first probe deletes packet loss counters recorded for sequence numbers up to the highest sequence number indicated in the new RTCP report.

8. The method of claim 6, wherein deducting the cumulative number of packets lost between the first UE and the first probe from the cumulative number of packets lost between the first UE and the second UE includes:

subtracting the cumulative number of packets lost between the first UE and the first probe from the cumulative number of packets lost between the first UE and the second UE.

9. The method of claim 6, wherein deducting the ratio of lost packets between the first UE and the first probe from the ratio of lost packets between the first UE and the second UE includes:
  converting the ratio of lost packets between the first UE and the first probe and the ratio of lost packets between the first UE and second UE to a cumulative number of packets lost between the first UE and the first probe and a cumulative number of packets lost between the first UE and the second UE, respectively,
  subtracting the converted cumulative number of packets lost between the first UE and the first probe from the converted cumulative number of packets lost between the first UE and the second UE, and
  converting the resulting cumulative number of packets lost on the segment to the ratio of lost packets on the segment.

10. The method of claim 1, wherein the first probe calculates the jitter value for packets between the first UE and the first probe using a continuous sliding window scheme using the following formula:

$$J(i) = J(i-1) - \frac{|D(i, i-1)| - J(i-1)}{16}$$

wherein, for packet i, J denotes a current jitter value and D denotes a difference of packet spacing between sender and receiver.

11. The method of claim 6, wherein deducting the jitter value for packets between the first UE and the first probe from the jitter value for packets between the first UE and the second UE includes applying the following formula:

$$J_1 \ominus J_2 = \sqrt{J_1^2 - J_2^2}$$

wherein $J_1$ denotes the jitter value for packets between the first UE and the first probe and $J_2$ denotes the jitter value for packets between the first UE and the second UE.

12. A computing unit for performing segment-wise analysis of a Real-Time Transport Protocol, RTP, flow carried from a first User Equipment, UE, to a second UE via a mobile network, the RTP flow being monitored by a plurality of probes in the mobile network, each of a first probe of the plurality of probes and a second probe of the plurality of probes is configured to calculate at least one performance indicator indicative of a performance associated with the RTP flow observed between the first UE and the respective probe, the computing unit comprising at least one processor and at least one memory, the at least one memory containing instructions executable by the at least one processor to configure the computing unit to:
  derive at least one segment performance indicator for a segment of the RTP flow between the first probe and the second probe of the segment by deducting the at least one performance indicator calculated by the first probe from at least one corresponding performance indicator associated with the second probe,
  derive at least one segment performance indicator for a segment of the RTP flow between the first probe and the second UE of the segment by deducting the at least one performance indicator calculated by the first probe from at least one corresponding performance indicator associated with the second UE, derive at least one segment performance indicator for a segment of the RTP flow between the second probe and the second UE of the segment by deducting the at least one performance indicator calculated by the second probe from the at least one corresponding performance indicator associated with the second UE, the at least one corresponding performance indicator associated with the second UE corresponds to at least one performance indicator included in an RTP Control Protocol, RTCP, report of the second UE, and the at least one performance indicator calculated by the first probe comprising a jitter value for packets between the first UE and the first probe and a cumulative number of packets lost between the first UE and the first probe, the first probe recording a packet loss counter for every sequence number of received RTP packets, and arrival of a new RTCP report from the second UE, the first probe calculates the cumulative number of packets lost between the first UE and the first probe as a difference between the packet loss counter recorded for a sequence number corresponding to a highest sequence number indicated in the new RTCP report and the packet loss counter recorded for a sequence number corresponding to a highest sequence number indicated in a previous RTCP report, the first probe calculating the jitter value for packets between the first UE and the first probe as a standard deviation of inter-arrival times for a predefined period of time.

13. A mobile network comprising:

a computing unit for performing segment-wise analysis of a Real-Time Transport Protocol, RTP, flow carried from a first User Equipment, UE, to a second UE via a mobile network, the RTP flow being monitored by a plurality of probes in the mobile network, each of a first probe of the plurality of probes and a second probe of the plurality of probes is configured to calculate at least one performance indicator indicative of a performance associated with the RTP flow observed between the first UE and the respective probe, the computing unit comprising at least one processor and at least one memory, the at least one memory containing instructions executable by the at least one processor to configure the computing unit to:

derive at least one segment performance indicator for a segment of the RTP flow between the first probe and the second probe of the segment by deducting the at least one performance indicator calculated by the first probe from at least one corresponding performance indicator associated with the second probe, derive at least one segment performance indicator for a segment of the RTP flow between the first probe and the second UE of the segment by deducting the at least one performance indicator calculated by the first probe from at least one corresponding performance indicator associated with the second UE, derive at least one segment performance indicator for a segment of the RTP flow between the second probe and the second UE of the segment by deducting the at least one performance indicator calculated by the second probe from the at least one corresponding performance indicator associated with the second UE, the at least one corresponding performance indicator associated with the second UE corresponds to at least one performance indicator included in an RTP Control Protocol, RTCP, report of the second UE, and the at least one performance indicator calculated by the first probe comprising a jitter value for packets between the first UE and the first probe and a cumulative number of packets lost between the first UE and the first probe, the first probe recording a packet loss counter for every sequence number of received RTP packets, and upon arrival of a new RTCP report from the second UE, the first probe calculates the cumulative number of packets lost between the first UE and the first probe as a difference between the packet loss counter recorded for a sequence number corresponding to a highest sequence number indicated in the new RTCP report and the packet loss counter recorded for a sequence number corresponding to a highest sequence number indicated in a previous RTCP report, the first probe calculating the jitter value for packets between the first UE and the first probe as a standard deviation of inter-arrival times for a predefined period of time.

* * * * *